(12) United States Patent
Nishizaki et al.

(10) Patent No.: US 7,854,575 B2
(45) Date of Patent: Dec. 21, 2010

(54) DISPLACEMENT AND DEFLECTION MEASURING DEVICE FOR MAIN SPINDLE IN MACHINE TOOL

(75) Inventors: Teruhiro Nishizaki, Toyama (JP); Yoshiharu Oyabe, Toyama (JP); Shiro Murai, Toyama (JP)

(73) Assignee: Komatsu NTC Ltd., Tokyo (JP)

( * ) Notice: Subject to any disclaimer, the term of this patent is extended or adjusted under 35 U.S.C. 154(b) by 904 days.

(21) Appl. No.: 11/741,856

(22) Filed: Apr. 30, 2007

(65) Prior Publication Data
US 2007/0258781 A1 Nov. 8, 2007

(30) Foreign Application Priority Data
Apr. 28, 2006 (JP) .................. P. 2006-126835

(51) Int. Cl.
*B23Q 17/22* (2006.01)
(52) U.S. Cl. .................. 409/239; 408/8; 408/13; 408/61; 409/186; 409/194; 700/175; 700/193
(58) Field of Classification Search .................. 409/80, 409/147–148, 186–187, 193–194, 207–208, 409/231, 238–239; 408/5–6, 8–11, 13, 60–61; 700/174–177, 192–193; 73/702; 33/636, 33/638, 639, 641–642; 374/55
See application file for complete search history.

(56) References Cited

U.S. PATENT DOCUMENTS

| | | | | |
|---|---|---|---|---|
| 3,602,090 A * | 8/1971 | Whetham | .................. | 409/239 |
| 4,628,441 A * | 12/1986 | Johnstone et al. | ........... | 700/193 |
| 4,808,048 A * | 2/1989 | Miller | ......................... | 409/239 |
| 5,214,592 A * | 5/1993 | Serizawa et al. | ............ | 700/193 |
| 5,779,405 A * | 7/1998 | Aiso et al. | ................... | 409/132 |
| 5,795,112 A * | 8/1998 | Senda | ......................... | 409/131 |
| 5,895,181 A * | 4/1999 | Ito et al. | ...................... | 409/132 |
| 7,367,756 B2 * | 5/2008 | Sugata et al. | ............... | 408/1 R |

FOREIGN PATENT DOCUMENTS

| JP | 2001-138178 A | 5/2001 |
|---|---|---|
| JP | 2005-313239 A | 11/2005 |

* cited by examiner

*Primary Examiner*—Daniel W Howell
(74) *Attorney, Agent, or Firm*—Sughrue Mion, PLLC

(57) ABSTRACT

A reference block 30 attached to a housing 20a is moved together with a main spindle 20 to a measurement start position A1, and the reference block 30 is so moved in a Z-axis direction as to across air injected from an air injection nozzle 25, so that a thermal displacement of the main spindle 20 is calculated based on change in pressure measured in the movement. The outer circumference of a tool mounted on the main spindle 20 is brought close to a leading end face of the air injection nozzle 25, and the air is injected to the outer circumference of the tool while rotating the tool at a predetermined position, and the air pressure is measured so that the rotational deflection of the tool is calculated based on the change in the measured pressure.

14 Claims, 8 Drawing Sheets

DISPLACEMENT AND DEFLECTION MEASURING DEVICE FOR MAIN SPINDLE IN MACHINE TOOL

BACKGROUND OF THE INVENTION

1. Field of the Invention

The present invention relates to a device for measuring displacement and deflection of a main spindle in a machine tool.

2. Description of Related Art

Generally, in the machine tool, a work is supported on an upper face of a bed through a work supporting table and a jig. On the bed, moreover, there is mounted a main spindle, which is moved by a numerical control in the three X-, Y- and Z-axis directions, and on which a tool holder equipped with a tool is mounted, so that the work is machined by the tool. In the related art, for movement of the main spindle in the three-axis directions, there is adopted a moving mechanism, which is mainly composed of a ball screw to be rotated by a servo mechanism, and a ball screw nut. Of this moving mechanism, when the moving mechanism for moving the main spindle back and forth in the axial direction is thermally expanded, an error occurs in the actual moving position of the main spindle. If the work is machined with this error, the machining precision of the work becomes deteriorated. Thus, there has been proposed a thermal displacement correcting device for the ball screw, as disclosed in Japanese Patent Unexamined Publication JP-A-2001-138178. This correcting device has a detector arranged at a position spaced by a predetermined distance in the axial direction from an end face of the free end of the ball screw. The change in the length of the ball screw is measured by the detector, so that the feed of the main spindle is corrected on the basis of the change.

In a tapered hole formed in the spindle of the main spindle, there is inserted and fixed a tapered shank portion of a tool holder that holds a tool. When chips are bitten on the contracting interface between the inner circumference of the tapered hole and the outer circumference of the tapered shank portion, the tool holder and the tool are inclined so that the work is not properly machined. Thus, there has been proposed a machine tool for discriminating the propriety of the rotational deflection of the tool holder. In Japanese Patent Unexamined Publication JP-A-2005-313239, there is disclosed a machine tool, which is equipped in the housing of the main spindle with a distance sensor opposed to the outer circumference of the outer circumference of the tool holder. This distance sensor measures the distance between the outer circumference of the rotating tool holder and the sensor, so that the propriety of the rotational deflection of the tool holder is judged according to the change in the measured distance.

However, the ball screw thermal displacement correcting device, as disclosed in JP-A-2001-138178, has a structure, in which the change in the length of the ball screw at a position spaced from the main spindle is measured, so that it cannot measure the thermal displacement of the main spindle, directly at a portion close to a portion machined. This raises a problem that the measuring precision cannot be improved. Moreover, when a foreign substance such as chips sticks to the end face of the ball screw, the measurement precision becomes deteriorated. This device of the related art has another problem that the thermal displacement of the tool holder or the tool mounted on the main spindle cannot be measured.

On the other hand, the machine tool, as disclosed in JP-A-2005-313239, for judging the propriety of the rotational deflection of the tool holder uses the non-contact type distance sensor. If the foreign substance such as chips sticks to the outer circumference of the tool holder, there arises a problem that the decision precision drops. This device of the related art has another problem that the thermal displacement of the main spindle in the feeding direction cannot be measured. Still another problem is that the sensor has to be cleared of the foreign substance such as chips, if any.

SUMMARY OF THE INVENTION

An object of the invention is to solve those problems existing in the related art, and to provide a device for measuring the displacement and the rotational deflection of a main spindle in a machine tool. The measurement device can measure both the thermal displacement of the main spindle and the rotational deflection of a tool holder or tool, and can improve the measurement precision.

In order to solve the aforementioned problems, according to the invention as set forth in the first aspect of the invention, there is provided a displacement and deflection measurement device for a main spindle for a machine tool which comprises:

a main spindle that is moved by a numerical control and is mounted on a bed;

a tool which machines a work supported on a work supporting device and is mounted on the main spindle through a tool holder, the displacement and deflection measurement device comprising:

a fluid injection nozzle mounted on the bed or the work supporting device;

a fluid supply source that supplies fluid to the fluid injection nozzle;

a measurement unit that measures pressure or flow rate of the fluid in a fluid passage defined from the fluid supply source to the fluid injection nozzle;

a thermal displacement calculating unit that calculates a thermal displacement of the main spindle on the basis of a change in the pressure or the flow rate of the fluid, which is measured by:

moving the main spindle to a measurement position set for the thermal displacement measurement so that the reference face, which is formed on a housing of the main spindle, opposes to the fluid injection nozzle; and injecting the fluid from the fluid injection nozzle to a reference face formed on a housing of the main spindle; and a rotational deflection calculating unit that calculates a rotational deflection of the tool holder or the tool on the basis of a change in the pressure or the flow rate of the fluid, which is measured by:

moving the main spindle to a measurement position set for the rotational deflection measurement so that the tool holder or the tool opposes to the fluid injection nozzle; and injecting the fluid from the fluid injection nozzle to the tool holder or the tool of the main spindle which is in rotating state.

According to a second aspect of the invention, as set forth in the first aspect of the inventions it is preferable that the reference face is formed on a reference block attached to the housing of the main spindle.

According to a third aspect of the invention, as set forth in the first aspect of the invention, it is preferable that the reference face is parallel to the axial direction of the main spindle, and the fluid injection nozzle is one in number.

According to a fourth aspect of the invention, as set forth in the third aspect of the invention, it is preferable that the thermal displacement calculating unit comprises:

a center position calculating section that calculates a center position of the reference face on the basis of the pressure or flow rate, which is measured when feeding the reference face in an axial direction of the main spindle from a measurement start position to a measurement end position at a constant speed while maintaining distance between the reference face and a leading edge of the fluid injection nozzle in an axial direction of the nozzle at a constant value; and a displacement calculating section calculates the thermal displacement on the basis of a reference center position stored in advance in a recording medium and a measurement center position calculated on the basis of the pressure or flow rate newly measured.

According to a fifth aspect of the invention, as set forth in the first aspect of the invention, it is preferable that the reference face is perpendicular to an axial direction of the main spindle.

According to a sixth aspect of the invention, there is provided a displacement and deflection measurement device for a main spindle for a machine tool which comprises:

a main spindle that is moved by a numerical control and is mounted on a bed;

a tool which machines a work supported on a work supporting device and is mounted on the main spindle through a tool holder, the displacement and deflection measurement device comprising:

a first fluid injection nozzle mounted on the bed or the work supporting device;

a second fluid injection nozzle mounted on the bed or the work supporting device;

a fluid supply source that supplies fluid to the first fluid injection nozzle and the second fluid injection nozzle, respectively;

first and second measurement units that measures pressures or flow rates of the fluid in fluid passages defined from the fluid supply source to the first and second fluid injection nozzles;

a thermal displacement calculating unit that calculates a thermal displacement of the main spindle, on the basis of the change in the pressure or the flow rate of the fluid, which is measured by injecting the fluid from the first fluid injection nozzle to a reference face formed on the housing of the main spindle while opposing the reference face to the first fluid injection nozzle; and a rotational deflection calculating unit that calculates a rotational deflection of the tool holder or tool on the basis of the change in the pressure or the flow rate of the fluid injected, which is measured by injecting the fluid from the second fluid injection nozzle to the tool holder or the tool of the main spindle while opposing the tool holder or the tool to the fluid injection nozzle.

According to a seventh aspect of the invention, as set forth in the sixth aspect of the invention, it is preferable that the reference face is formed on a reference block attached to the housing of the main spindle.

According to an eighth aspect of the invention, as set forth in the sixth aspect of the invention, it is preferable that the reference face is perpendicular to an axial direction of the main spindle, the first fluid injection nozzle is disposed so as to oppose to the reference face, and the thermal displacement calculating unit comprises:

a position calculating section that calculates a position of the reference face on the basis of the pressure or flow rate measured when the reference face is brought close to a leading edge of the first fluid injection nozzle from the measurement start position; and a displacement calculating section that calculates the thermal displacement of the main spindle on the basis of a reference position calculated value calculated by the position calculating portion in advance and stored in a recording medium and a measurement position calculated value calculated on the basis of the pressure or the flow rate newly measured.

According to a ninth aspect of the invention, as set forth in the aspect of the invention, it is preferable that the reference face is perpendicular to an axial direction of the main spindle, the first fluid injection nozzle is disposed so as to oppose to the reference face, and the thermal displacement calculating unit comprises:

a center position calculating section that calculates a center position of the reference face on the basis of the pressure or the flow rate, which is measured when feeding the reference face in an axial direction of the main spindle from a measurement start position to a measurement end position at a constant speed while maintaining distance between the reference face and a leading edge of the first fluid injection nozzle in an axial direction of the nozzle at a constant value and a displacement calculating section that calculates the thermal displacement on the basis of a reference center position stored in advance in a recording medium and a measurement center position calculated on the basis of the pressure or flow rate newly measured.

According to a tenth aspect of the invention, as set forth in the sixth aspect of the invention, it is preferable that the housing of the main spindle has a reference face parallel to the axial direction of the main spindle, the second fluid injection nozzle opposes to the reference face in a direction perpendicular to the axial direction of the main spindle; and the thermal displacement calculating unit calculates the thermal displacement of the main spindle on the basis of the change in the pressure or flow rate of the fluid, which is measured by injecting the fluid from the second fluid injection nozzle to the reference face while opposing the reference face to the second fluid injection nozzle.

According to eleventh and twelfth aspects of the invention, as set forth in the first and sixth aspects of the invention, it is preferable that the rotational deflection calculating unit comprises:

a first deflection calculating unit that calculates a first deflection on the basis of a first measured pressure measured when the tool holder or tool is moved to a first measurement position;

a first decision unit that decides whether or not the first deflection is within a first deflection allowance stored in advance in a recording medium;

a second deflection calculating unit that calculates a second deflection on the basis of the second measurement pressure newly measured when the tool holder or tool is moved to a second measurement position closer than the first measurement position to the fluid injection nozzle; and a second decision unit that decides whether or not the second deflection is within a second deflection allowance stored in advance in a recording medium.

According to thirteenth and fourteenth aspects of the invention, as set forth in the fourth and ninth aspects of the invention, it is preferable that the reference face is formed on a reference block attached to the housing of the main spindle.

According to the inventions as set forth in the first through the fifth aspect of the invention, the thermal displacement of the main spindle can be calculated by the thermal displacement calculating unit on the basis of the change in the pressure or the flow rate of the fluid which is measured by injecting the fluid from the fluid injection nozzle to a reference face formed on the housing of the main spindle while opposing the reference face to the fluid injection nozzle.

Moreover, the rotational deflection of the tool holder or tool can be calculated by the rotational deflection calculating unit on the basis of the change in the pressure or the flow rate of the fluid which is measured by injecting the fluid from the fluid injection nozzle to the tool holder or the tool of the main spindle while opposing the tool holder or the tool to the fluid injection nozzle.

As a result, the thermal displacement of the main spindle and the rotational deflection of the tool holder or the tool can be measured by the single fluid injection nozzle, so that the parts number can be reduced and can reduce the cost.

Moreover, the fluid is injected from the fluid injection nozzle to the reference face or the outer circumference of the tool holder or tool. As a result, the reference face, the outer circumference of the tool holder or tool, and the fluid injection nozzle can be cleared so as to be free from the foreign substance such as chips, thereby to improve the pressure measuring precision and accordingly the measuring precision of the thermal displacement and the rotational deflection.

According to the invention as set forth in sixth through tenth aspect of the invention, the first fluid injection nozzle and the second fluid injection nozzle are individually disposed so that the directions of the two nozzles can be individually set proper for their individual measurements.

According to the invention as set forth in the eleventh aspect of the invention, the rotational deflection of the tool holder or the tool can be safely measured at the two stages, and the rotational deflection failure can be precisely decided.

BRIEF DESCRIPTION OF THE DRAWINGS

FIG. 3 is a flow chart for explaining the measuring operation of the thermal displacement;

DETAILED DESCRIPTION OF EXEMPLARY EMBODIMENTS OF THE INVENTION EMBODIMENTS

A first embodiment of a displacement and deflection measuring device of a main spindle in a machine tool according to a first embodiment is described in the following with reference to FIG. 1 to FIG. 9.

Figure 7:
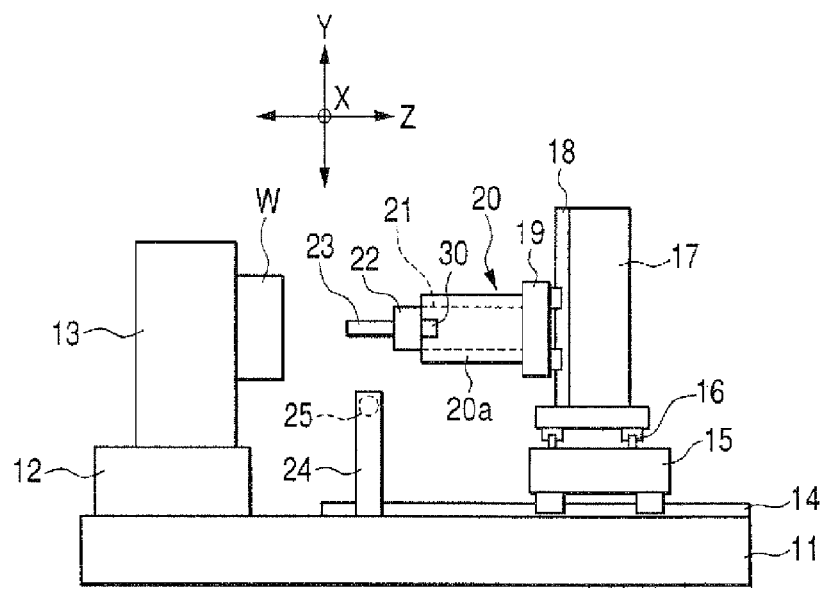
FIG. 7 is a schematic front elevation showing the entire constitution of a machine tool.

First of all, the schematic constitution of the machine tool is described. On a work supporting table 12 mounted on an upper face of a bed 11, as shown in FIG. 7, a work W is supported through a jig 13. On the upper face of the bed 11, there are laid Z-axis guide rails 14, on which a Z-axis saddle 15 is supported reciprocally in a Z-axis direction (or in a transverse direction of FIG. 7) by a later-described Z-axis drive mechanism 45A (as referred to FIG. 9) of ball-screw type. On the upper face of the Z-axis saddle 15, there are laid X-axis guide rails 16, on which an X-axis column 17 is mounted reciprocally in the X-axis direction (or in a direction normal to the paper sheet of FIG. 7) by a later-described X-axis drive mechanism 45B (as referred to FIG. 9). On the front face of the X-axis column 17, there are guided Y-axis guide rails 18, on which a Y-axis saddle 19 is mounted reciprocally in a Y-axis direction (or in vertical direction of FIG. 7) by a later-described Y-axis drive mechanism 45C (as referred to FIG. 9). In this embodiment, a work supporting device has the work supporting table 12 and the jig 13.

On the Y-axis saddle 19, there is mounted a main spindle 20, which supports a spindle 21 rotatably therein. A tool holder 22 carrying a tool 23 is mounted in the spindle 21. The tool holder 22 having the used tool mounted therein is extracted from the spindle 21 by the not-shown tool replacing device so that it is replaced by a tool holder having a new tool.

On the upper face of the bed 11, there is mounted through a bracket 24 an air injection nozzle 25 as a fluid injection nozzle. This air injection nozzle 25 is supported, as shown in FIG. 8, in the axial direction of the main spindle 20, i.e., in an X-axis (horizontal) direction perpendicular to the Z-axis direction.

Figure 1:
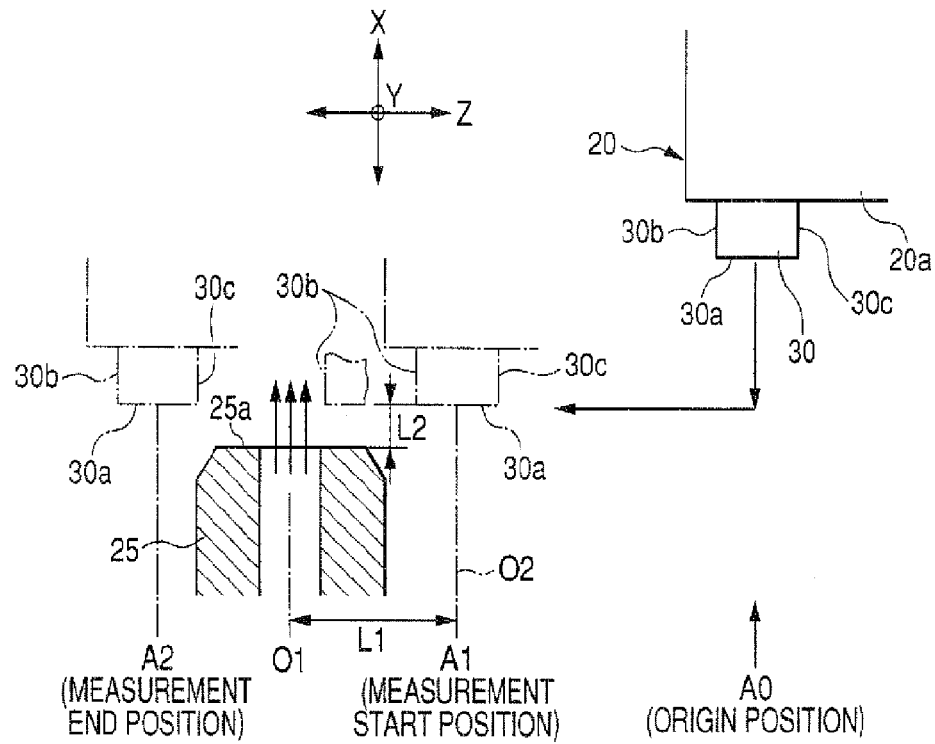
FIG. 1 is an explanatory diagram of a method for measuring the thermal displacement of a main spindle of a first embodiment of the invention.
Figure 8:
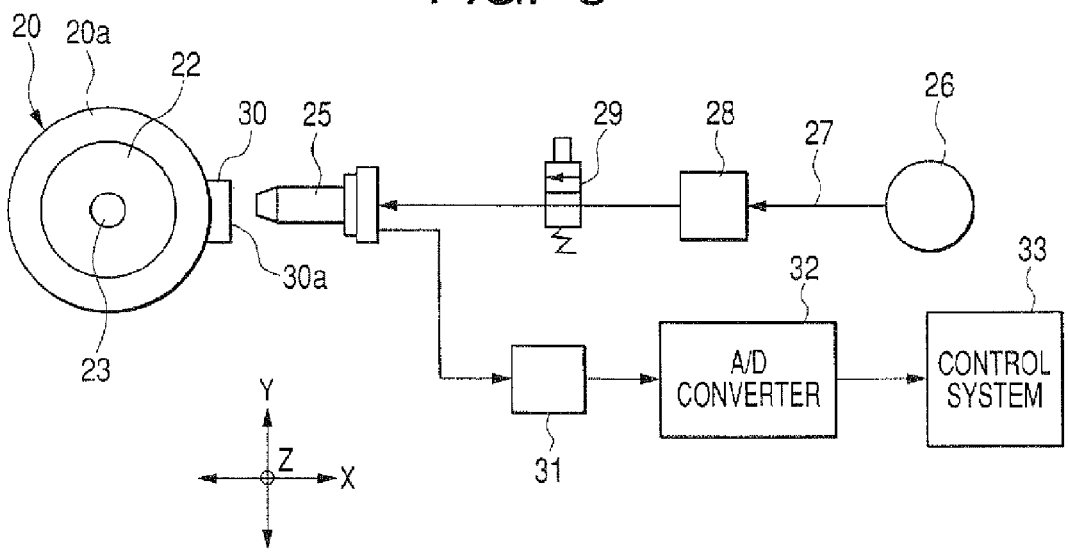
FIG. 8 is an explanatory view showing a measuring device of a thermal displacement.

To the air injection nozzle 25, as shown in FIG. 8, the pressure air is fed from an air supply source 26 as a fluid supply source such as a compressor via an air piping 27. To this air piping 27, there are connected a regulator 28 for holding the pressure and flow rate of air at constant values and an electromagnetic Open/close valve 29. On the outer circumference of the housing 20a of the main spindle 20, there is mounted a reference block 30 for measuring the thermal displacement. This reference block 30 is formed, as shown in FIG. 1 and FIG. 8, to include a reference face 30a parallel to the Z-axis and normal to the X-axis, and a front side face 30b and a back side face 30c formed at a right angle on the two end portions of the reference face 30a in the Z-axis direction. The air, as injected from the air injection nozzle 25, is blown to the reference face 30a of the reference block 30. The air injected from the air injection nozzle 25 is also blown to the outer circumference of the tool holder 22 or the outer circumference of the tool 23 at the time of measuring the rotational deflection of the tool holder 22 or the tool 23.

To the air injection nozzle 25, as shown in FIG. 8, there is connected a pressure gauge 31 as a measurement unit for measuring the pressure inside of the air injection nozzle 25. The pressure value (data) of an analog signal, as measured by that pressure gauge 31, is converted into a digital signal by an A/D converter 32 thereby to control the various operations of the machine tool, and the digital signal is fed to a control system 33 for correcting the thermal displacement of the machining program of the work.

Figure 9:
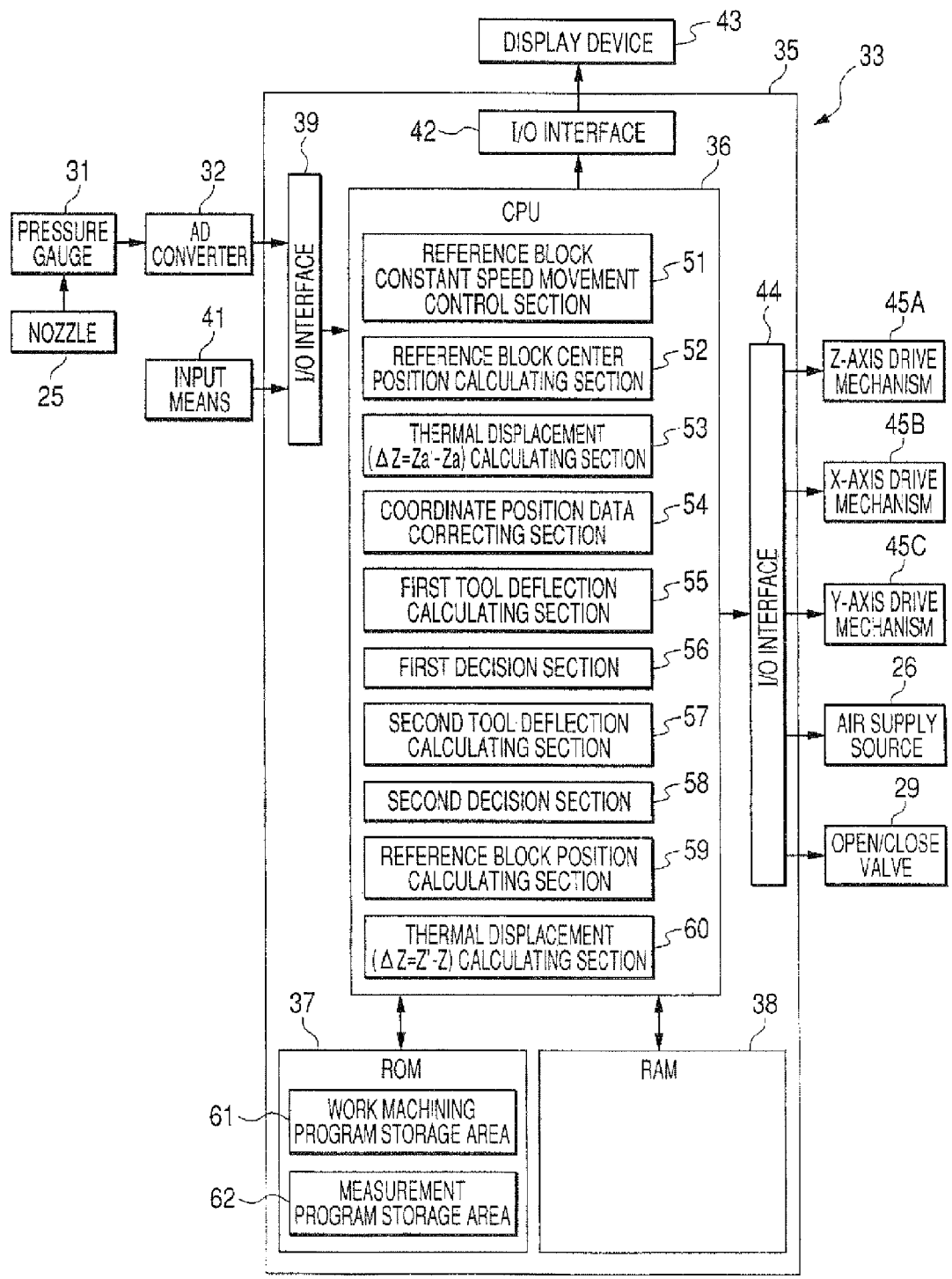
FIG. 9 is a block circuit diagram of a control system.

Next, the constitution and the function of the control system 33 are described with reference to FIG. 9.

A control device 35 is equipped with a central processing unit (CPU) 36 for performing various processing operations. With this CPU 36, there is connected a read only memory (ROM) 37 as a rewritable nonvolatile recording medium, which stores various kinds of data such as a work machining program or a measuring program for controlling operations of the machine tool. With the CPU 36, there is connected a random access memory (RAM) 38 as a readable/writable recording medium, which stores various kinds of data. With the CPU 36, there is connected through an input/output interface 39 input means (41) such as the A/D converter 32, a keyboard or a mouse. With the CPU 36, there is also connected through an input/output interface 42 a display device 43 as an informing device. With CPU 36, there is also connected through an input/output interface 44 and a not-shown drive circuit X-axis, Y-axis and Z-axis drive mechanisms 45A, 45B and 45C, by which the main spindle 20 is moved under numerical controls, respectively, in the Z-axis, X-axis and Y-axis directions. Moreover, the air supply source 26 and the Open/close valve 29 are connected with the input/output interface 44 through the not-shown drive circuit.

The CPU 36 is equipped with a reference block constant speed movement control section 51 for moving the reference block 30 together with the main spindle 20 at a constant speed in the Z-axis direction, after the main spindle 20 was moved from an origin position A0 to a measurement start position A1 of which position is set at the same level as that of the air injection nozzle 25, as shown in FIG. 1.

The measurement start position A1 is set, as shown in FIG. 1, at a position, in which the reference face 30a of the reference block 30 has its center O2 spaced in the Z-axis direction by a predetermined distance L1 (e.g., 20 mm) from the center axis O1 of the air injection nozzle 25 and in which the reference face 30a is spaced in the X-axis direction by a predetermined distance L2 (e.g., 0.2 mm) from the leading end face 25a of the air injection nozzle 25.

Moreover, the CPU 36 is equipped with a center position calculating section 52 for calculating the center position of the reference block 30 in the Z-axis. The CPU 36 is further equipped with a thermal displacement calculating section 53 as thermal displacement calculating section for calculating the thermal displacement of the main spindle 20 in the Z-axis direction on the basis of both the reference center position (or the calculated value) stored in advance in the RAM 38 and the reference center position (or the calculated value) stored in advance in the RAM 38. The CPU 36 is further equipped with a coordinate position data correcting section 54 for correcting the coordinate position data of the main spindle 20 in the Z-axis direction on the basis of the thermal displacement.

Figure 4:
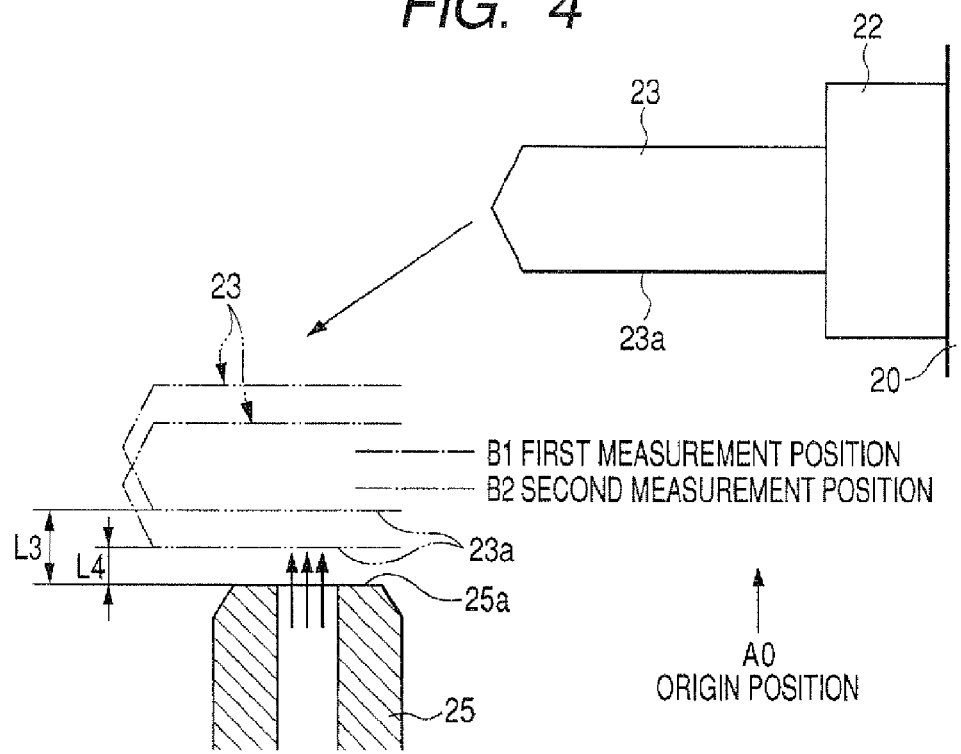
FIG. 4 is an explanatory diagram of a method for measuring the rotational deflection of a tool.

The CPU 36 is equipped with a first deflection calculating section 55 for calculating a first deflection of the tool on the basis of the pressure value (data) which is measured by the pressure gauge 31 when the tool 23 is rotated so that the air is injected from the air injection nozzle 25, after the tool 23 was moved, as shown in FIG. 4, from the origin position A0 to a first deflection measurement position B1 of which position is set at the same level as that of the air injection nozzle 25. Likewise, the CPU 36 is equipped with a first decision section 56 for deciding whether or not the first deflection is within the first deflection allowance by comparing the first allowance value stored in advance in the RAM 38 and the first deflection newly measured and calculated. The CPU 36 is further equipped with a second deflection calculating section 57 and a second decision section 58 for performing similar to those of the first deflection calculating section 55 and the first decision section 56 after the tool 23 was moved in the X-axis direction closer to the air injection nozzle 25 than the first deflection measurement position B1.

The CPU 36 is equipped with a Z-axis direction position calculating section 59 and a thermal displacement calculating section 60 of the reference block 30, which are to be used in a machine tool of a later-described second embodiment.

The ROM 37 is equipped with a work machining program storage area 61 for storing a work machining program to control the machining operations, a measurement program storage area 62, and areas for storing various kinds of data. The RAM 38 is stored with various kinds of data such as the measured pressure value (data).

Here are described operations of the CPU 36 of the control device 35 thus constituted, and the various kinds of operations of the machine tool, which are carried out with the various kinds of signals, which are outputted from the control device 35.

At first, the measurement calculating operations of the thermal displacement of the main spindle 20 in the Z-axis direction are described with reference to FIG. 1 to FIG. 3. The various kinds of operations, as shown in the flow chart of FIG. 3, are performed on the basis of the control signals coming from the control system 33 shown in FIG. 9.

Figure 3:
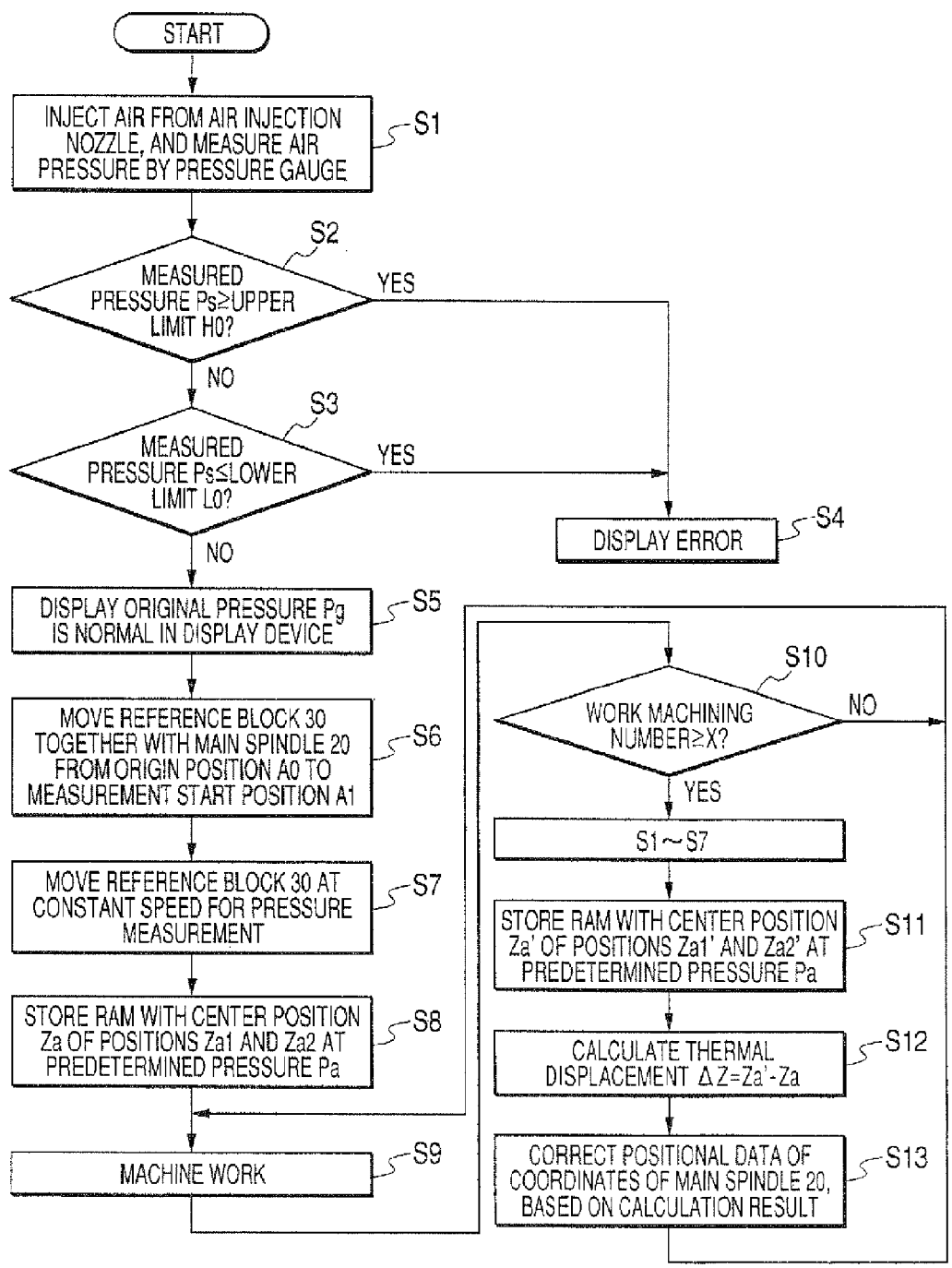
FIG. 3 is a flow chart for explaining the operation to measure the thermal displacement.

In the state where the reference block 30 is at the origin position A0, as shown by solid lines in FIG. 1, at Step S1 of FIG. 3, the Open/close valve 29 is opened to inject the air from the air injection nozzle 25, and the pressure of the air is measured by the pressure gauge 31. At Step S2, it is decided by the CPU 36 whether or not a measured pressure Ps is higher than an upper limit to H0 stored in advance in the RAM 38. If this answer is NO, it is decided at Step S3 whether or not the measured pressure Ps is lower than a lower limit L0 stored in advance in the RAM 38. In case the answers of Step S2 and S3 are YES, an error is displayed in the display device 43, and the failure is remedied by the worker.

When the answer of Step S3 is NO, it is displayed in the display device 43 at Step S5 that the measured pressure Ps, i.e., the original pressure Pg is "normal".

Next, at Step S6, the reference block 30 is moved together with the main spindle 20 from the origin position A0 to the measurement start position A1. At Step S7, on the basis of the control signal from the reference block constant speed movement control section 51, the reference block 30 is moved at a constant speed for the pressure measurement in the Z-axis direction from the measurement start position A1, as shown in FIG. 1, and is stopped at a measurement end position A2. At this time, the curve of the measured pressure Ps of the pressure gauge 31 is shown by the pressure curve, which is composed of a horizontal portion e1 of the constant original pressure Pg, a pressure rising portion e2, a horizontal portion e3 of the constant pressure, a pressure lowering portion e4 and a horizontal portion e5, as indicated by a solid line in FIG. 2.

Figure 2:
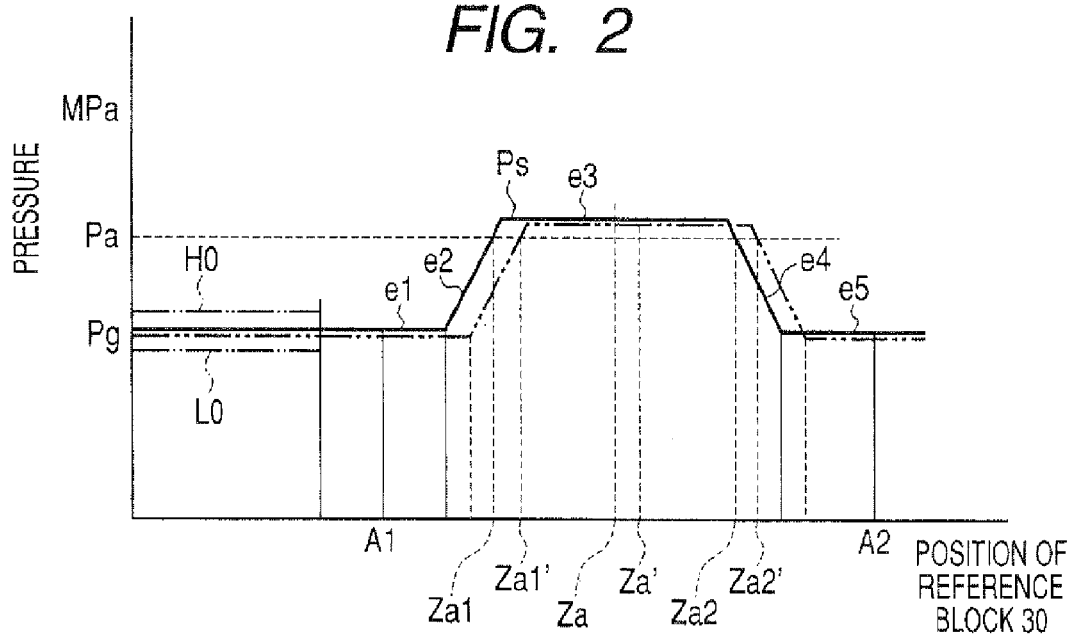
FIG. 2 is a graph illustrating a relation between the position of a reference block and a measured pressure.

Next at Step S8, the center position Za of the reference block 30 the position Za1 of the front side face 30b and the position Za2 of the back side face 30c of the reference block 30 at the time, when the measured pressure Ps is at a predetermined pressure Pa, as stored in advance in the RAM 38, as shown in FIG. 2, is calculated by the center position calculating section 52, and the RAM 38 is stored with the calculated value as the reference center position Za.

The preparing operations for measuring the thermal displacement of the main spindle 20 in the Z-axis direction are ended by the operations thus far described.

Here are described the heat displacement measuring and calculating operations of the Z-axis drive mechanism 45A, which are performed at the instant when the work machining number exceeds a set value X after the work machining operation was performed at Step S9, after the it was decided at Step 510 by the central processing device CPU 36 whether or not the work machining number had exceeded the set number X.

When the answer of Step S10 of FIG. 3 is YES, operations similar to those of the aforementioned Steps S1 to S7 are performed. Specifically, the operation to measure the original pressure is performed, and the reference block 30 is moved from the origin position A0 to the measurement start position A1. The reference block 30 is moved at a constant speed for the pressure measurement from the measurement start position A1 to the measurement end position A2.

Then, at Step S11, the center position Za' between the position Za1' of the front side face 30b of the reference block 30 and the position Za2' of the back side face 30c when the measured pressure Ps measured by the pressure gauge 31 is the predetermined pressure Pa is calculated, and the calculated value is stored in the RAM 38.

At Step S12, the thermal displacement $\Delta Z = Za' - Za$ is calculated by the thermal displacement calculating section 53.

At Step S13, the position data of the work machining program on the coordinates of the main spindle 20 is corrected by the coordinate position data correcting section 54 on the basis of the thermal displacement $\Delta Z$. After this, the flow chart returns to Step S9 for the work machining operation.

Figure 5:
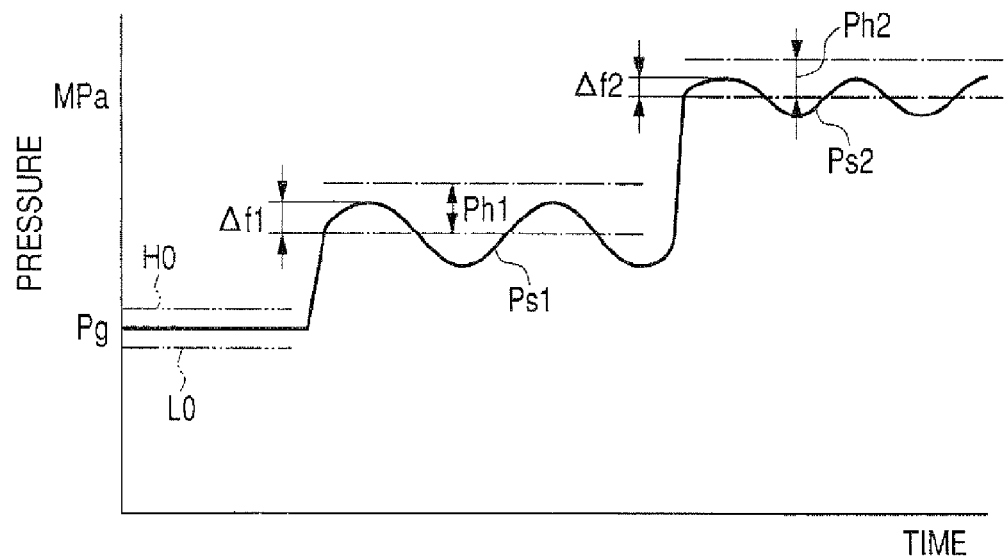
FIG. 5 is a graph illustrating a relation between the measuring time of the rotational deflection and a pressure.
Figure 6:
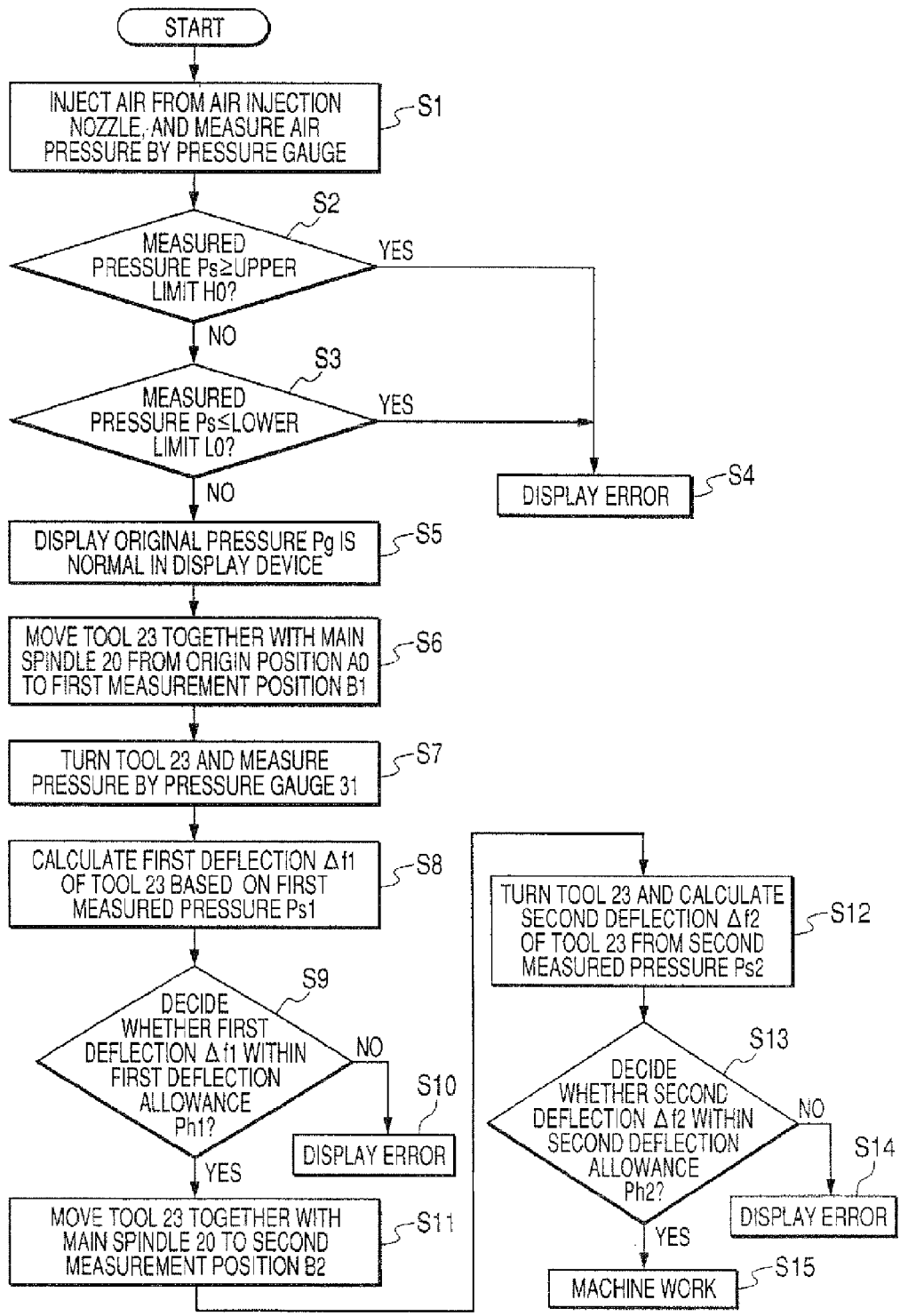
FIG. 6 is a flow chart for explaining the operations to measure the rotational deflection.

Next, the operations to measuring and calculating the rotational defection of the tool 23 are described mainly with reference to FIG. 4 to FIG. 6.

In this measuring and calculating operations, too, after the operations similar to those of Steps S1 to S5 shown in FIG. 3 are performed, at Step S6 as shown in FIG. 6, the tool 23 is quickly fed together with the main spindle 20 by the three-axis drive mechanism from the origin position A0 to the first deflection measurement position B1, as shown in FIG. 4, and is then fed at a low speed (e.g., 200 mm/min.). The distance L3 between the outer circumference 23a of the tool 23 at the first deflection measurement position B1 and the leading end face 25a of the air injection nozzle 25 is set to 0.4 mm, for example.

At Step S7, the tool 23 is rotated, and the air is blown from the air injection nozzle 25 to the outer circumference 23a of the tool 23. The pressure of the air is measured by the pressure gauge 31, and is stored as a first measured pressure Ps1 in the RAM 38. This first measured pressure Ps1 appears in a sinusoidal curve, as shown in FIG. 5, if the tool 23 has a rotational deflection.

On the basis of this pressure value (data), at Step S8, a first deflection $\Delta f1$ of the tool 23 is calculated by the first deflection calculating section 55 and is stored in the RAM 38.

At Step S9, it is decided whether or not the first deflection $\Delta f1$ is within a first deflection allowance Ph1 stored in advance in the RAM 38.

When this answer is NO, an error display is made in the display device 43 in Step S10, and the mounting portion of the tool holder 22 is cleaned by the worker.

When the answer of Step S9 is YES, the tool 23 is moved at Step S11 at a low speed together with the main spindle 20 to a second deflection measurement position B2, as shown in FIG. 4. A distance L4 between the outer circumference 23a of the tool 23 in that second deflection measurement position B2 and the leading end face of the air injection nozzle 25 is set to 0.2 mm, for example.

At Step S12, the tool 23 is rotated, and the air is blown to the outer circumference 23a of the tool 23, so that a second measured pressure Ps2 is measured the pressure gauge 31. This second measured pressure Ps2 also takes a sinusoidal curve like the first measured pressure Ps1, and a second deflection $\Delta f2$ of the tool 23 is calculated by the second deflection calculating section 57 and is stored in the RAM 38.

Next, it is decided at Step S13 by the second decision section 58 whether or not the second deflection $\Delta f2$ is within a second deflection allowance Ph2 stored in advance in the RAM 38. When this answer is No, the error is displayed in the display device 43 at Step S14, and the mounting portion of the tool holder 22 is cleaned by the worker.

When the answer Step S13 is YES, the highly precise work machining is performed at Step S15.

The following advantages can be attained by the thermal displacement and rotation deflection measuring device of the main spindle for the machine tool of the first embodiment.

(1) In the first embodiment, one air injection nozzle 25 disposed at a predetermined position is caused, measuring pressure of the air by the pressure gauge 31 by injecting the air to the reference block 30 while moving the reference block 30 of the main spindle 20 from the measurement start position A1 to the measurement end position A2 with respect to the single air injection nozzle 25 which is positioned at predetermined position. On the basis of thus measured pressure Ps, the thermal displacement $\Delta Z$ in the Z-axis direction is calculated.

Moreover, the outer circumference 23a of the tool 23 is moved with respect to the air injection nozzle 25 to the measurement position, and the rotational deflection of the tool 23 is calculated. It is decided whether or not that the thus calculated deflection is within the deflection allowance.

By using the single air injection nozzle 25, the measurement and calculation of the thermal displacement $\Delta Z$ and the measurement and calculation of the rotational deflection of the tool 23 can be performed and numbers of the parts and the cost can be reduced.

(2) In the first embodiment, the air is injected from the air injection nozzle 25 to the reference face 30a of the reference block 30 and the outer circumference 23a of the tool 23. As a result, the reference face 30a and the outer circumference 23a can be cleared so as to be free from a foreign substance such as chips. Thus, the measurement precision of the pressure can be improved. As a result, it is possible to improve the measurement precisions of the thermal displacement of the main spindle 20 in the Z-axis direction and the rotational deflection of the tool 23.

(3) In the first embodiment, the position Za1' and the position Za2' of the reference block 30 are calculated on the basis of the pressure Ps, as measured in the procedure of the reference block 30 from the measurement start position A1 and the measurement end position A2 and shown in FIG. 2, and the predetermined pressure Pa.

Moreover, the measurement center position Za' of the reference block 30 is calculated from the two positions Za1' and Za2', and the thermal displacement $\Delta Z$ is calculated on the basis of the reference center position Za stored in advance in the RAM 38. As a result, the measuring calculation precision of the thermal displacement of the reference block 30 in the Z-axis direction can be improved to improve the work machining precision.

(4) In the first embodiment, the outer circumference 23a of the tool 23 is brought close to the air injection nozzle 25 and moved sequentially to the first deflection measurement position 31 and the second deflection measurement position B2. The first deflection Δf1 and the second deflection Δf2 of the tool 23 are sequentially calculated, and are decided on whether or not they are within the first deflection allowance Ph1 and the second deflection allowance Ph2. Thus, the measurements are performed at the two stages.

Therefore, it is possible to avoid the collision, which might otherwise occur between the air injection nozzle 25 and the outer circumference 23a of the tool 23 if the measurement is performed by moving the air injection nozzle 25 abruptly to the second deflection measurement position B2 while the tool 23 has a large rotational deflection. Thus, it is possible to prevent the damage of the air injection nozzle 25 in advance.

Next, a second embodiment of the invention is described with reference to FIG. 7 and FIG. 9 to FIG. 12.

Figure 10:
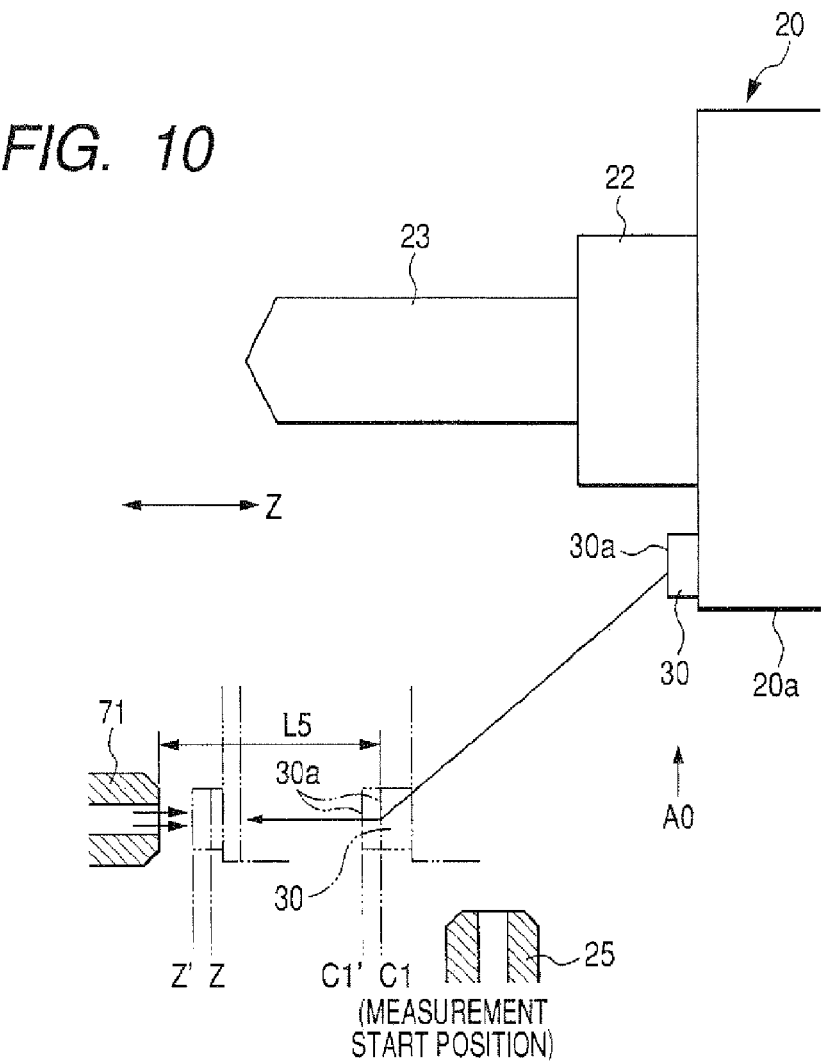
FIG. 10 is an explanatory diagram of a method for measuring the thermal displacement of a second embodiment of the invention.

In the second embodiment, a first air injection nozzle 71 or a first fluid injection nozzle to be used for measuring the thermal displacement is attached at such a position to the bed 11, the work supporting table 12 or the jig 13, as shown in FIG. 17, as is directed in the Z-axis direction, as shown in FIG. 10. To the air supply passage of the first air injection nozzle 71, there is connected the first pressure gauge as the first measuring unit (not shown). The air injection nozzle 25, as shown in FIG. 7 and FIG. 10, functions as the second air injection nozzle as the second fluid injection nozzle to be used for measuring the rotational deflection of the tool holder 22 or the tool 23. The pressure gauge 31 functions as the second pressure gauge as the second measurement unit. Moreover, the reference block 30 is so attached to the front end face of the housing 20a of the main spindle 20 that the reference face 30a may be normal to the Z-axis direction.

Figure 11:
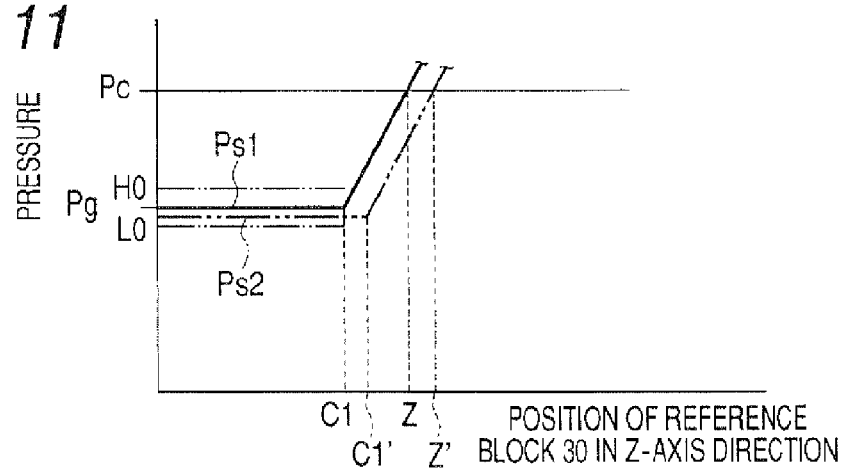
FIG. 11 is a graph illustrating a relation between the position of the main spindle 20 in the Z-axis direction and the measured pressure.

Next, the operations to measure the thermal displacement of the main spindle 20 in the Z-axis direction in the second embodiment are described with reference to FIG. 11 and FIG. 12.

Figure 12:
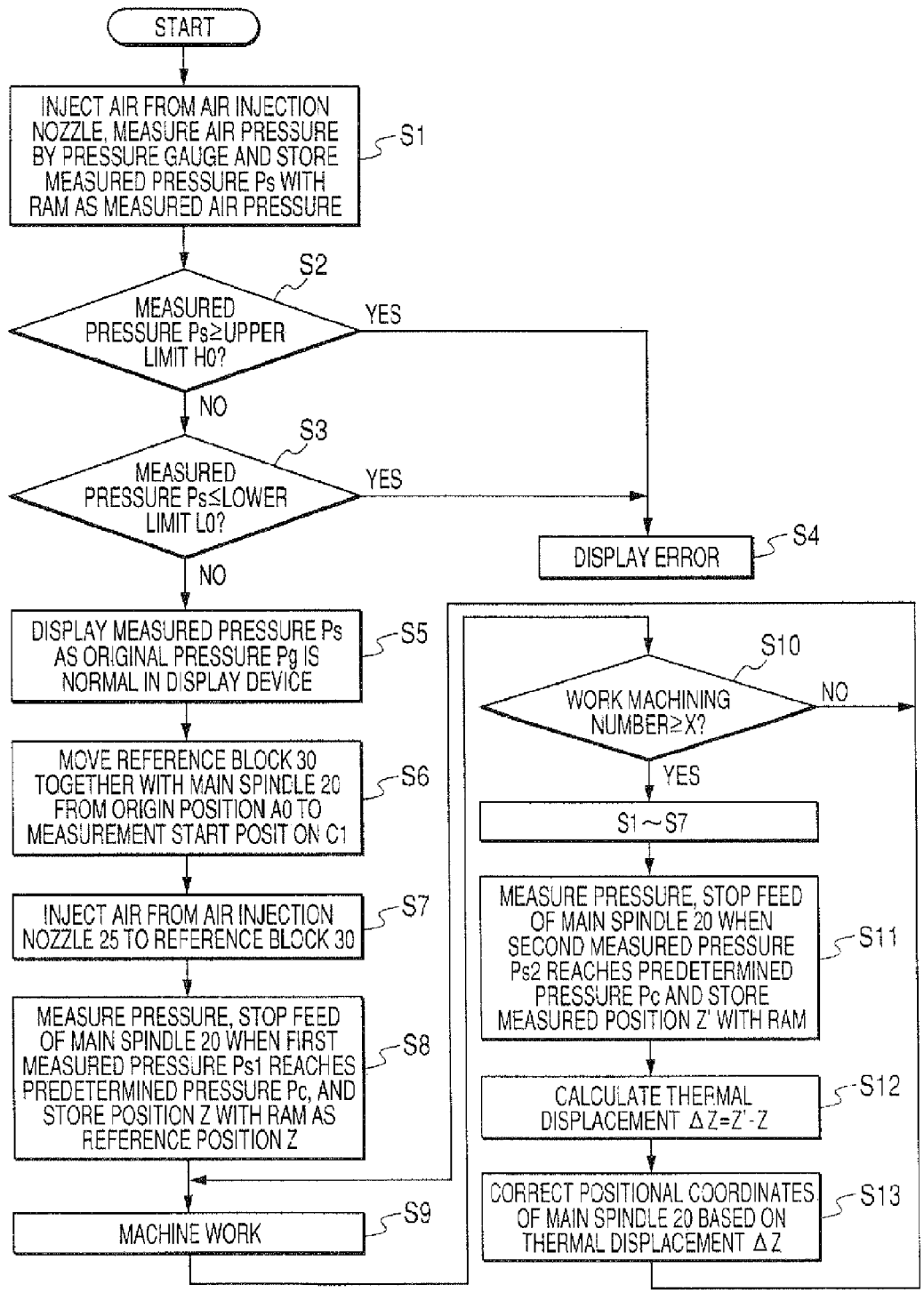
FIG. 12 is a flow chart for explaining the measuring operation of the thermal displacement.

Steps S1 to S5 of FIG. 12 are similar in operations of Steps S1 to S5, as shown in FIG. 3, of the first embodiment.

At Step S6 of FIG. 12, the reference block 30 is moved together with the main spindle 20 from the origin position A0 to a measurement start position C1. This measurement start position C1 is set such that the reference face 30a of the reference block 30 is opposed to the first air injection nozzle 71, and such that it is spaced by a predetermined distance L5 (e.g., 0.6 mm) from the leading end of the first air injection nozzle 71 in the Z-axis direction.

After this, the air is injected at Step S7 from the air injection nozzle 71 to the reference face 30a of the reference block 30, and the reference block 30 is moved at Step S8 in the Z-axis direction toward the air injection nozzle 71. The measured pressure Ps1 by the pressure gauge 31 rises, as indicated by a solid line in FIG. 11. At the instant when the measured pressure Ps1 reaches a predetermined pressure Pc, the feed of the reference block 30 is stopped, and this position of the reference block 30 is stored in advance as a reference position Z in the Z-axis direction in the RAM 38.

The measurement preparing operations are ended by the operations thus far described.

Next, at Step S9, the work machining operations is performed.

At Step S10, it is decided by the central processing unit CPU 36 whether or not the work machining number has exceeded the preset value. At the exceeding instant, the operation to measure the thermal displacement of the main spindle 20 in the Z-axis direction is performed.

After Step S10, operations are performed at foregoing Steps S1 to S7. Specifically, the operation to measure the original pressure is performed, and the reference block 30 is moved at the constant speed for the pressure measurement. The reference block 30 is moved from the origin position A0 to the measurement start position C1. The reference block 30 is moved from the measurement start position C1 to the air injection nozzle 71.

At Step S11, the pressure is measured by the pressure gauge 31. This pressure is indicated by double-dotted lines in FIG. 11. As apparent from FIG. 11, with a thermal displacement in the main spindle 20, the actual measurement start position C11 of the reference block 30, which should have moved to the measurement start position C1, is different from the standard measurement start position C1, so that the rise starting position of the second measured pressure Ps2 is displaced to C1. When this second measured pressure Ps2 reaches the predetermined pressure Pc, the feed of the main spindle 20 is stopped. A position Z' of the reference block 30 in the Z-axis direction at this instant is calculated by the position calculating section 59 of the reference block 30, and the calculated value of the measurement position Z' is stored in the RAM 38.

Next at Step S12, the thermal displacement ΔZ of the main spindle 20 is calculated from the equation (ΔZ=Z'−Z) by the thermal displacement calculating section 60 on the basis of the reference position Z and the measurement position Z'.

At Step S13, the position coordinates of the main spindle 20 in the Z-axis direction are corrected by the coordinate position data correcting section 54 on the basis of the thermal displacement ΔZ, and the flow chart is returned to Step S9 for the work machining operation.

In the second embodiment, the first air injection nozzle 71 for measuring the thermal displacement of the main spindle 20 and the second air injection nozzle 25 for measuring the rotational deflection of the tool 23 are individually disposed so that the two nozzles 71 and 25 can be directed in the directions proper for the individual measurements. As a result, the measurement program of the thermal displacement of the main spindle 20 by the first air injection nozzle 71 can be changed from the complicated program using the pressure curve shown in FIG. 2 into the simple program using the pressure curve shown in FIG. 1, so that the program setting operation can be facilitated.

Here, the embodiment can be modified into the following manners.

In the first and second embodiments, the thermal displacement in the Z-axis direction, i.e., in the feeding direction of the main spindle 20 is measured and calculated. However, the main spindle 20 may be embodied into a constitution, which is equipped with a reference face parallel to the Z-axis direction and perpendicular to the X-axis or a reference face perpendicular to the Y-axis direction, so that the second air injection nozzle 25 is commonly used for the thermal displacement measurements in the X-axis direction or in the Y-axis direction.

It is conceivable that the thermal displacement of the main spindle 20 in the X-axis direction is calculated on the basis of the pressure change of the horizontal portion e3 of the measured pressure Ps, as shown in FIG. 2. On the other hand, the measurement and calculation of the thermal displacement in the Y-axis direction can be performed by moving the main spindle 20 in the Y-axis direction on a principle like that of the measuring and calculating operations of the thermal displacement in the Z-axis direction, for example.

The air injection nozzles 25 and 71 may be replaced by a nozzle for injecting a liquid such as coolant or oil. The invention may also be embodied by a system for measuring the pressure of a fluid or a system for measuring the flow rate of a fluid.

The positions for disposing the bracket 24 and the air injection nozzle 25 may be changed to the work supporting table 12 or the jig 13.

For the outer circumference or leading end face of the housing 20a of the main spindle 20, there may be a planar reference face having a function similar to that of the reference face 30a of the reference block 30.

The pressure of the passage of the air from the regulator 28 to the air injection nozzle 25 may be measured by the pressure gauge 31.

In this second embodiment shown in FIG. 10, one air injection nozzle 25 may be omitted, and the other air injection nozzle 71 may measure not only the thermal displacement but also the rotational deflection of the tool holder 22 or the tool 23. In this modification, it is conceivable to rotate the tool 23 while the outer circumference edge of the leading end portion of the tool holder 22 or the tool 23 being brought close to the leading end face of the nozzle 71, thereby to measure the pressure by the pressure gauge 31 thereby to calculate the rotational deflection from the change in the measured pressure.

The principle of the thermal displacement measuring method of the Z-axis direction of the main spindle 20, as shown in FIG. 1, may be applied only to the thermal displacement measuring method of the X-axis or Y-axis direction of the main spindle 20, or to the thermal displacement measuring method of the Z-axis direction and the X-axis direction, of the Z-axis direction and the Y-axis direction, of the X-axis direction and the Y-axis direction, and of the X-, Y- and Z-axis directions.

The principle of the thermal displacement measuring method of the Z-axis direction of the main spindle 20 by the first air injection nozzle 71, as shown in FIG. 10, may be applied only to the thermal displacement measuring method of the X-axis or Y-axis direction of the main spindle 20, or to the thermal displacement measuring method of the Z-axis direction and the X-axis direction, of the Z-axis direction and the Y-axis direction, of the X-axis direction and the Y-axis direction, and of the X-, Y- and Z-axis directions.

The constitution may also be modified such that the thermal displacement of the X-axis direction, the Y-axis direction or the Z-axis direction of the main spindle 20 is measured by using the second air injection nozzle 25 for the deflection measurement, as shown in FIG. 10, or such that the thermal displacements of the Z-axis direction and the X-axis direction, of the Z-axis direction and the Y-axis direction, or of the X-axis direction and the Y-axis direction. The measurement of this thermal displacement is exemplified by the measurement method of the first embodiment shown in FIG. 1.

The failure measurement of the original pressure may be omitted.

The method for deciding whether or not the work machining number exceeds the set value may be replaced by a method for deciding it by a timer whether or not the set time is exceeded.

The invention may also be exemplified by a machine tool, in which the main spindle 20 is moved only in the Z-axis direction, a machine tool, in which the same is moved only in the Z-axis direction and the X-axis direction, or a machine tool, in which the same is moved only in the Z-axis direction and the Y-axis direction.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A displacement and deflection measurement device for a main spindle for a machine tool which comprises:
    a main spindle that is moved by a numerical control and is mounted on a bed;
    a tool which machines a work supported on a work supporting device and is mounted on the main spindle through a tool holder,
    the displacement and deflection measurement device comprising:
    a fluid injection nozzle mounted on the bed or the work supporting device;
    a fluid supply source that supplies fluid to the fluid injection nozzle;
    a measurement unit that measures pressure or flow rate of the fluid in a fluid passage defined from the fluid supply source to the fluid injection nozzle;
    a thermal displacement calculating unit that calculates a thermal displacement of the main spindle on the basis of a change in the pressure or the flow rate of the fluids which is measured by:
        moving the main spindle to a measurement position set for the thermal displacement measurement so that the reference face, which is formed on a housing of the main spindle, opposes to the fluid injection nozzle; and
        injecting the fluid from the fluid injection nozzle to a reference face formed on a housing of the main spindle; and
    a rotational deflection calculating unit that calculates a rotational deflection of the tool holder or the tool on the basis of a change in the pressure or the flow rate of the fluid, which is measured by:
        moving the main spindle to a measurement position set for the rotational deflection measurement so that the tool holder or the tool opposes to the fluid injection nozzle; and
        injecting the fluid from the fluid injection nozzle to the tool holder or the tool of the main spindle which is in rotating state.

2. The displacement and deflection measurement device according to claim 1, wherein
    the reference face is formed on a reference block attached to the housing of the main spindle.

3. The displacement and deflection measurement device according to claim 1, wherein
    the reference face is parallel to the axial direction of the main spindle, and
    the fluid injection nozzle is one in number.

4. The displacement and deflection measurement device according to claim 3, wherein
    the thermal displacement calculating unit comprises:
    a center position calculating section that calculates a center position of the reference face on the basis of the pressure or flow rate, which is measured when feeding the reference face in an axial direction of the main spindle from a measurement start position to a measurement end position at a constant speed while maintaining distance between the reference face and a leading edge of the fluid injection nozzle in an axial direction of the nozzle at a constant value; and
    a displacement calculating section calculates the thermal displacement on the basis of a reference center position stored in advance in a recording medium and a measurement center position calculated on the basis of the pressure or flow rate newly measured.

5. The displacement and deflection measurement device according to claim 1, wherein
the reference face is perpendicular to an axial direction of the main spindle.

6. A displacement and deflection measurement device for a main spindle for a machine tool which comprises:
a main spindle that is moved by a numerical control and is mounted on a bed;
a tool which machines a work supported on a work supporting device and is mounted on the main spindle through a tool holder,
the displacement and deflection measurement device comprising:
a first fluid injection nozzle mounted on the bed or the work supporting device;
a second fluid injection nozzle mounted on the bed or the work supporting device;
a fluid supply source that supplies fluid to the first fluid injection nozzle and the second fluid injection nozzle, respectively;
first and second measurement units that measures pressures or flow rates of the fluid in fluid passages defined from the fluid supply source to the first and second fluid injection nozzles;
a thermal displacement calculating unit that calculates a thermal displacement of the main spindle, on the basis of the change in the pressure or the flow rate of the fluid, which is measured by injecting the fluid from the first fluid injection nozzle to a reference face formed on the housing of the main spindle while opposing the reference face to the first fluid injection nozzle; and
a rotational deflection calculating unit that calculates a rotational deflection of the tool holder or tool on the basis of the change in the pressure or the flow rate of the fluid injected, which is measured by injecting the fluid from the second fluid injection nozzle to the tool holder or the tool of the main spindle while opposing the tool holder or the tool to the fluid injection nozzle.

7. The displacement and deflection measurement device according to claim 6, wherein
the reference face is formed on a reference block attached to the housing of the main spindle.

8. The displacement and deflection measurement device according to claim 6, wherein
the reference face is perpendicular to an axial direction of the main spindle,
the first fluid injection nozzle is disposed so as to oppose to the reference face, and
the thermal displacement calculating unit comprises:
a position calculating section that calculates a position of the reference face on the basis of the pressure or flow rate measured when the reference face is brought close to a leading edge of the first fluid injection nozzle from the measurement start position; and
a displacement calculating section that calculates the thermal displacement of the main spindle on the basis of a reference position calculated value calculated by the position calculating portion in advance and stored in a recording medium and a measurement position calculated value calculated on the basis of the pressure or the flow rate newly measured.

9. The displacement and deflection measurement device according to claim 6, wherein
the reference face is perpendicular to an axial direction of the main spindle,
the first fluid injection nozzle is disposed so as to oppose to the reference face, and
the thermal displacement calculating unit comprises:
a center position calculating section that calculates a center position of the reference face on the basis of the pressure or the flow rate, which is measured when feeding the reference face in an axial direction of the main spindle from a measurement start position to a measurement end position at a constant speed while maintaining distance between the reference face and a leading edge of the first fluid injection nozzle in an axial direction of the nozzle at a constant value and
a displacement calculating section that calculates the thermal displacement on the basis of a reference center position stored in advance in a recording medium and a measurement center position calculated on the basis of the pressure or flow rate newly measured.

10. The displacement and deflection measurement device according to claim 6, wherein
the housing of the main spindle has a reference face parallel to the axial direction of the main spindle,
the second fluid injection nozzle opposes to the reference face in a direction perpendicular to the axial direction of the main spindle; and
the thermal displacement calculating unit calculates the thermal displacement of the main spindle on the basis of the change in the pressure or flow rate of the fluid, which is measured by injecting the fluid from the second fluid injection nozzle to the reference face while opposing the reference face to the second fluid injection nozzle.

11. The displacement and deflection measurement device according to claim 1, wherein
the rotational deflection calculating unit comprises:
a first deflection calculating unit that calculates a first deflection on the basis of a first measured pressure measured when the tool holder or tool is moved to a first measurement position;
a first decision unit that decides whether or not the first deflection is within a first deflection allowance stored in advance in a recording medium;
a second deflection calculating unit that calculates a second deflection on the basis of the second measurement pressure newly measured when the tool holder or tool is moved to a second measurement position closer than the first measurement position to the fluid injection nozzle; and
a second decision unit that decides whether or not the second deflection is within a second deflection allowance stored in advance in a recording medium.

12. The displacement and deflection measurement device according to claim 6, wherein
the rotational deflection calculating unit comprises:
a first deflection calculating unit that calculates a first deflection on the basis of a first measured pressure measured when the tool holder or tool is moved to a first measurement position;
a first decision unit that decides whether or not the first deflection is within a first deflection allowance stored in advance in a recording medium;

a second deflection calculating unit that calculates a second deflection on the basis of the second measurement pressure newly measured when the tool holder or tool is moved to a second measurement position closer than the first measurement position to the fluid injection nozzle; and a second decision unit that decides whether or not the second deflection is within a second deflection allowance stored in advance in a recording medium.

13. The displacement and deflection measurement device according to claim 4, wherein
the reference face is formed on a reference block attached to the housing of the main spindle.

14. The displacement and deflection measurement device according to claim 9,
the reference face is formed on a reference block attached to the housing of the main spindle.

* * * * *